United States Patent [19]

Kennedy et al.

[11] Patent Number: 4,743,438
[45] Date of Patent: May 10, 1988

[54] PROCESS FOR PRODUCING PHOSPHORIC ACID FROM LOW PURITY PHOSPHATE ROCK

[75] Inventors: George A. Kennedy; James R. Lehr, both of Florence, Ala.

[73] Assignee: Tennessee Valley Authority, Muscle Shoals, Ala.

[21] Appl. No.: 26,092

[22] Filed: Mar. 16, 1987

Related U.S. Application Data

[63] Continuation-in-part of Ser. No. 655,012, Sep. 27, 1984, now Defensive Publication No. 105,603.

[51] Int. Cl.$^4$ .............................................. C01B 25/16
[52] U.S. Cl. .................................... 423/320; 423/167; 423/319
[58] Field of Search ......................... 423/167, 319, 320

[56] References Cited

U.S. PATENT DOCUMENTS 4,435,370  3/1984  Holcomb et al. ................... 423/167

Primary Examiner—John Doll
Assistant Examiner—Wayne A. Langel
Attorney, Agent, or Firm—Robert A. Petrusek

[57] ABSTRACT

An improved process for extending the capabilities of an existing, conventional wet-process phosphoric acid production plant to more effectively utilize phosphate values contained in low purity phosphate rock which process comprises (1) adjustment of the maximum soluble sulfate level in phosphoric acid taken from, for example, the conventional wet-process acid facility prior to reacting same with such low purity phosphate rock, in combination therewith, and (2) control of the parameters of (a) ratio of attack acid to feed rock, (b) reaction temperature, and (c) reaction time. Said improved process effects selective dissolution of calcium and phosphate values from such rock without incurring unwanted and undesired high codissolution of congeneric aluminum and iron impurities therein. After separation from the undissolved impurity-containing gangue, the resulting solution of calcium phosphate in phosphoric acid is returned to a conventional wet-process facility for subsequent treatment with sulfuric acid to produce phosphoric acid and calcium sulfate, while the gangue is washed to recover additional phosphate values, and the wash liquor is transported to a conventional facility where it is used to wash the calcium sulfate filter cake.

6 Claims, 2 Drawing Sheets

PROCESS FOR PRODUCING PHOSPHORIC ACID FROM LOW PURITY PHOSPHATE ROCK

The invention herein described may be manufactured and used by and for the Government for governmental purposed without the payment to us of any royalty therefor.

This application is a continuation-in-part of application Ser. No. 655,012, filed Sept. 27, 1984, now Defensive Publication T105,603, published July 2, 1985, for PROCESS FOR PRODUCING PHOSPHORIC ACID FROM LOW PURITY PHOSPHATE ROCK.

INTRODUCTION

The present invention relates to an improvement in process for the production of phosphoric acid from phosphate rock. More particularly, it relates to an improved manner whereby phosphate values which are contained in phosphate rock of low grade and low purity are recovered in a form that can satisfactorily be fed to an existing conventional wet-process phosphoric acid production facility, which facility otherwise could not satisfactorily be operated with feed materials comprising such low grade, low purity feed phosphate rock.

BACKGROUND OF THE INVENTION

1. Field of the Invention

A widely practiced, commercially important method for manufacturing phosphoric acid from phosphate rock, referred to hereinafter for the sake of convenience as the conventional wet process, and more simply as the wet process, comprises the reaction of phosphate rock with sulfuric acid to produce phosphoric acid and by-product calcium sulfate. In such conventional wet process, the phosphate rock feed material is finely ground and subsequently digested in a mixture of sulfuric and recycled phosphoric acids for a relatively long time (e.g., four to six hours) and at an elevated temperature (e.g., 75° C., and above) in order to achieve high conversion of the mineral phosphate values therein to phosphoric acid and to produce, as a by-product therefrom, calcium sulfate crystals which can be filtered and washed efficiently from mother liquor. Satisfactory and economical operation of such conventional wet processes requires a relatively high purity phosphate rock feed material; low purity rock feeds cause many known difficulties in the rock grinding, acidulation, filtration, filter cake washing, and other operations of the process, and high levels of impurities dissolved in the acids produced from low purity rock cause difficulties in the subsequent manufacture of phosphate fertilizers from such wet-process phosphoric acid.

In order to prepare phosphate rock which meets conventional wet-process feed material purity specifications, most naturally occurring phosphate ore must first be beneficiated by a combination of washing, sizing, flotation, calcination, and like treatments to separate the phosphatic constituent from impurity minerals and organic contaminants. A significant consideration attendant to such ore preparation is the fact that substantial amounts of the phosphate values contained in the ore normally are not recovered by these treatments, i.e., they are lost from the process feed stream. As a consequence of such consideration, prior-art researchers have devoted considerable attention to minimizing the rather large amounts of phosphate values that are discarded with the minus 150-mesh slime material generated during such beneficiation of, for instance, Florida phosphate ore. In addition, such prior-art researchers have long considered and attempted to solve the problems associated with losing appreciable amounts of phosphate which occurs during further beneficiation treatments of deslimed materials, particularly during phosphate rock flotation operations. Typically, about 20 percent of the phosphate contained in deslimed flotation feeds (materials sized between about minus 14-mesh and plus 150 mesh) is discarded with the flotation mill tailings. Flotation of coarse material (about minus 14-mesh to about plus 35 mesh) is particularly inefficient; about 50 percent of the phosphate content in the coarse flotation feed is not recovered.

Not all phosphate rock products from the beneficiation treatments are sufficiently pure to be used as conventional wet-process feed materials; as for example, low-grade phosphate rock pebble in which silicon-, iron-, and/or aluminum-containing mineral inclusions render the product grade and its ratio of impurities-to-phosphate unacceptable for use as acid plant feed. Although these materials might be crushed to liberate phosphate from the included impurities and then subjected to further beneficiation to recover the librated phosphate, this will increase the amounts of phosphate that are lost in the form of minus 150-mesh materials and material lost by inefficiencies in the flotation operations. It is also possible, and a common practice in the industry, to blend lower and higher purity phosphate rock so that the average composition of the blend meets specified purity levels. However, as will be described in the following section, rock blending does not provide a universal means to expand the capabilities of the conventional wet process to allow recovery of phosphate values from any low purity rock product.

2. Description of the Prior Art

Numerous prior-art references describe alternatives to the conventional wet process which are applicable to the production of phosphoric acid from low purity phosphate rock. One generally disclosed method is a sequential type of wet process which comprises reacting phosphate rock with recycled phosphoric acid to form a solution phase of monocalcium phosphate dissolved in phosphoric acid and a solid phase of undissolved gangue material, separating the undissolved gangue from the solution, reacting the monocalcium phosphate solution with sulfuric acid to produce a solid calcium sulfate and phosphoric acid solution, separating the phosphoric acid solution from the calcium sulfate, recycling a portion of the phosphoric acid solution to the rock acidulation stage, and withdrawing the remaining phosphoric acid solution as product. As examples of sequential wet processes, see U.S. Pat. Nos. 2,531,977, Hammaren et al., Nov. 28, 1950; 3,619,136, Case, Nov. 9, 1971; 4,435,370, Holcomb et al., Mar. 6, 1984; 4,029,743, Hauge, June 14, 1977, and the references cited therein. The rock acidulation conditions of these processes are mild relative to those of the conventional wet process. Control of temperature, ratio of acid to rock, reaction time, concentration of dissolved fluorine, and like conditions to achieve high solubilization of phosphate contained in the rock feed with minimal coextraction of impurities is taught in the disclosures of sequential wet processes mentioned above as well as in U.S. Pat. No. 3,843,767, Faust et al., Oct. 22, 1974.

It will be appreciated by those skilled in this art that prior art wet processes of the sequential type do not provide the means for extending the capabilities of existing conventional wet-process phosphoric acid production facilities to accept phosphate values from lower purity phosphate rock feeds. Rather, the processes of the prior art are taught to be operated as separate facilities in place of existing, convenional wet-process acid production facilities. Practice of these prior-art teachings would involve separate operations of sequential and conventional acidulation facilities to process the lower and higher purity feeds, respectively, that are produced at a given mining and beneficiation facility, and these separate operations would require costly replications of equipments, particularly gypsum filtrations and wash equipment, acid pumps, and facilities to store the recycle and the product acids. Fortunately, these costly replications are avoided in the process of the instant invention.

It also will be appreciated that the stated intent of many prior art sequential-type processes (e.g., '370 and '136 supra) is a much or more directed to the recovery of by-product fluorine-containing materials as to the efficient production of phosphoric acid from the available resources of higher and lower purity phosphate rock. Defluorination treatments that are a vital part of inventions such as that of '370 supra render the resultant solutions of calcium phosphate in phosphoric acid unsatisfactory for incorporation into the feed streams of an existing, conventional wet-process phosphoric acid facility. It is well known that alkali fluosilicate salts are not totally insoluble in phosphoric acid [Sven-Eric Dahlgren in A. V. Slack (ed.), *Phosphoric Acid*, Vol. 1, Part 1, Marcel Dekker, Inc., New York, p. 113 (1968)]. Therefore, solutions generated after defluorination treatments such as that taught by Holcomb et al, supra will contain residual concentrations of alkali metal ions and alkali metal fluosilicate salts that are equal to the saturation concentrations of these salts. The presence of the alkali metal ions and fluosilicate salts will increase levels of scale formation on equipment used for cooling and evaporating operations that are essential in the wet-process method and the production of concentrated phosphoric acid. The increased buildup of fluosilicate scale on acid plant equipment will require frequent and inefficient shut downs of acid production operations for cleaning.

The prior art also teaches methods for incorporating phosphate values from low-grade, low purity phosphate rock into the feed streams of existing wet-process acid production plants by the practice of blending small amounts of the lower purity rock with higher purity feed rock. Difficulties in preparing reliably homogeneous mixtures of solid mixtures by blending cause discontinuities in the compositions of the blended feed rock streams, and these discontinuities create disturbances in the chemistry of the wet process which interfere with the process operator's ability to maintain a smooth, continuous production of phosphoric acid. It should be noted that blending does not reduce the total quantity of impurities that are associated with the low purity rock constituent. Rather, they are incorporated into the blend and report with it to the wet-process feed grinding and acidulation operations, which thereby restricts the amounts of lower purity rock that can be blended with the available supply of higher purity rock. In contrast, the method of the present invention provides a way to selectively reject a portion of the congeneric impurity of the low purity rock and, thereby, overcome problems of increased ratios of impurities to phosphate in feeds that are prepared by blending high and low purity rock. Furthermore, the instant method provides for the blending of phosphate values in the form of solutions rather than solids, and thereby overcomes problems associated with inhomogeneous feedstocks prepared by dry rock blending.

SUMMARY OF THE INVENTION

In its broadest embodiment, the instant process comprises the treatment of low purity phosphate rock with a portion of the filter-grade or recycle phosphoric acid intermediates withdrawn from an existing conventional wet-process acid manufacturing plant to thereby produce a solution of monocalcium phosphate in phosphoric acid, and controlling the conditions of the reaction between the acid and rock to cause high dissolution of calcium and phosphate values and low dissolution of impurities. The solution phase is separated from undissolved impurities and is returned to the wet-process acid plant where it is reacted with sulfuric acid to produce calcium sulfate and phosphoric acid. The solid phase containing the selectively rejected impurities is washed to increase the total recovery of phosphate values; the wash liquors also are incorporated into the existing wet-process acid plant, and the impurity material is discarded.

OBJECTS OF THE INVENTION

It is therefore a principal object of the present invention to provide an improved method for producing relatively pure phosphoric acid from low purity phosphate rock.

It is a further object of the present invention to provide a method for combining methods of selectively dissolving calcium and phosphate values from low purity phosphate rock with the conventional wet-process art approach for producing phosphoric acid.

A further object of the present invention is to provide a method for recovering phosphate values from low purity phosphate rock without the necessity of grinding the rock feed to 200-mesh, or smaller, sizes to avoid incurring the high cost of a pregrading stage in the process.

A still further object of the present invention is to avoid the adulteration of higher quality feed rock by blending in the low-quality ore grades, as presently practiced, which can result in costly upsets in the conventional acidulation process.

Another object of the present invention is to provide a method for recovering phosphate values from low purity phosphate rock without incurring the relatively high losses of phosphate that usually accompany recovery of phosphate values by conventional flotation beneficiation methods.

In satisfaction of the foregoing objects and advantages, the present invention provides an improved process for selectively extracting calcium and phosphate values from low purity phosphate rock with minimal coextraction of congeneric impurities such as Fe, Al, Si, and Fi; and subsequently treating the resulting extracted calcium and phosphate with sulfuric acid to produce calcium sulfate and phosphoric acid product.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing from the true spirit and scope of the present invention.

DESCRIPTION OF THE DRAWINGS

The present invention, together with further objects and advantages thereof, will be better understood from a consideration of the following description taken in connection with the accompanying drawings in which.

DESCRIPTION OF THE PREFERRED EMBODIMENTS IN CONJUNCTION WITH THE DRAWINGS

Figure 1:
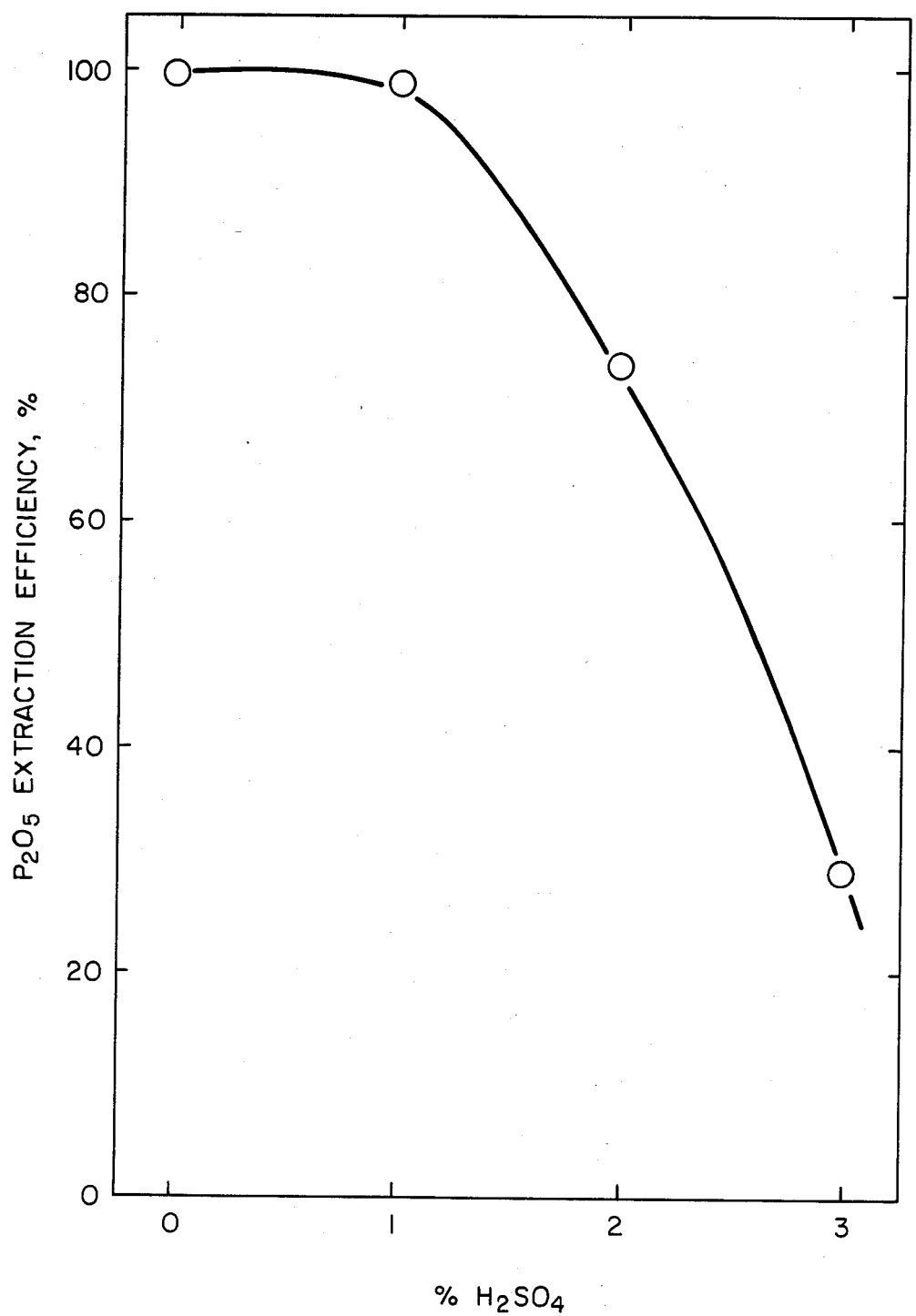
FIG. 1 is a graphical illustration of the $P_2O_5$ extraction efficiencies achieved by dissolving phosphate rock in mixtures of $H_3PO_4$ and $H_2SO_4$.

For the sake of clarity and a better understanding of the applicability of the graphical as well as the diagrammatically illustrations of the two drawings comprising FIG. 1 and FIG. 2 supra, a more detailed description of same is incorporated into the description of the preferred embodiment of the instant invention below.

As indicated above, the present invention is principally concerned with the recovery of phosphate values contained in phosphate rock wherein said rock is of low purity and cannot normally be satisfactorily used directly as feed material to conventional wet processes. More particularly the present invention is concerned with the production of phosphoric acid from such recovered phosphate values. The process of the present invention differs from prior-art processes for the production of phosphoric acid from low purity phosphate rock in that the present process is not a substitution for the conventional wet-process approach, but is an improved method thereover for selectively extracting phosphate values from low purity rock with a higher $P_2O_5$ recovery efficiency than is accomplished in extraction by the phosphate rock flotation method. The instant invention also provides an improved method for incorporating phosphate values contained in low purity phosphate rock into the feed to a conventional wet-process phosphoric manufacturing plant with less coincorporation of impurities also contained in the low purity rock than is accomplished with the practice of blending together low purity and high purity rock. Thus, the present invention serves to supplement existing conventional wet processes, making more efficient use of equipment and phosphate rock raw materials than prior-art approaches.

The gist underlying the concept of the improved process of the present invention is based in part on the fact that the dissolution of impurities from accessory minerals contained in low purity phosphate rock is strongly influenced by the concentrations of HF and $H_2SiF_6$ in the acid used to decompose the rock [G. A. Kennedy, 2nd International Congress on Phosphorus Compounds Proceedings, IMPHOS, Boston, Mass., Apr. 21-25, pp. 433-441 (1980)], and the fact that the solubility of fluorine is very low in solutions of monocalcium phosphate in phosphoric acid [T. D. Farr, G. Tarbutton, and H. T. Lewis, Jr., *Jour. Phys. Chem.*, 66, 318 (1962)]. By acidulating low purity phosphate rock with phosphoric acid or with a mixture of phosphoric and sulfuric acids containing less sulfuric acid than is needed to react with all of the calcium in the feed rock, a buildup in the concentrations of HF and $H_2SiF_6$ and the subsequent reactions of these compounds with the impurity-containing accessory minerals are greatly reduced. Dissolution of impurities is further retarded by minimizing the reaction temperature and the time of contact between the attack acid and the impurity materials. Other reaction conditions necessary to achieve retardation of impurities dissolution while achieving high dissolution of the calcium phosphate mineral are known in the prior art and reported in the patent literature, to wit, '136, '767, and '743, supra.

In the principal embodiments of the process of the present invention, acid for dissolving the calcium phosphate mineral is taken from any convenient point in the recycle and product acid circulation lines and storage tanks of a conventional wet-process acid operation. Although almost any strength acid normally available, i.e., ranging from about 20 percent to about 50 percent $P_2O_5$ may be utilized, the solubility characteristics of monocalcium phosphate in phosphoric acid at the moderate temperature which produce lower impurities dissolution make it preferable to use an attack acid containing from about 25 percent $P_2O_5$ to about 35 percent $P_2O_5$. Because most conventional wet processes operate with an excess sulfuric acid to promote the growth of easily filtered calcium sulfate crystals, product acids normally contain free sulfuric acid at concentrations above about 1.5 percent.

As shown in FIG. 1 infra, we have found that it is necessary to reduce the free sulfuric acid concentration in the attack acid before mixing it with the coarsely ground low purity phosphate rock in order to prevent the growth of calcium sulfate coatings on the rock particle surfaces and thereby maintain high $P_2O_5$ extraction efficiency.

Referring now more specifically to FIG. 1, the effect of $H_2SO_4$ concentration on $P_2O_5$ extraction efficiency is illustrated wherein is shown the fraction of $P_2O_5$ dissolved in 15 minutes from a minus 35-mesh plus 150 mesh, 24 percent $P_2O_5$ phosphate rock feed material reacted at 75° C. With mixtures of $H_3PO_4$ and $H_2SO_4$ containing 30 percent $P_2O_5$ and the indicated $H_2SO_4$ concentration. To achieve $P_2O_5$ extraction efficiencies above about 75 percent, it is necessary to reduce the $H_2SO_4$ concentration in the attack acid to less than about 2.0 percent free $H_2SO_4$. Preferably, to achieve extraction efficiencies above about 90 percent the $H_2SO_4$ concentration must be reduced to less than about 1.5 percent. This is accomplished by treating the attack acid taken from the conventional wet-process acid plant with a source of calcium in order to convert the free $H_2SO_4$ to $CaSO_4$. Any calcium source, but preferably a calcium source containing phosphate such as a portion of monocalcium phosphate-phosphoric acid solution, finely ground high purity phosphate rock, or superphosphate, may be mixed with the attack acid to adjust the free $H_2SO_4$ concentration prior to mixing the acid with the coarse low purity rock. As is known, the weight ratio of attack acid-to-phosphate rock required to effect efficient dissolution of the phosphate rock is determined by the solutility limits in the system, and generally the ratio of $P_2O_5$ in the acid-to-$P_2O_5$ in the rock should be from about 10:1 to about 35:1.

It is essential in the practice of the instant invention that undissolved gangue, which typically comprises silica, silicate and oxide minerals containing aluminum and iron, and the calcium fluoride produced by reaction of fluorapatite with phosphoric acid; be separated from the monocalcium phosphate solution before the solution is treated with sulfuric acid to produce calcium sulfate and phosphoric acid; otherwise, impurities contained in the gangue will be solubilized in subsequent reactions whereby hydrogen fluoride produced by reaction of calcium fluoride and sulfuric acid attacks and decomposes the silicate and oxide minerals to produce silicon tetrafluoride, fluosilicic acid, and dissolved aluminum and iron. Separation of the solid gangue and calcium fluoride from the monocalcium phosphate solution can, of course, be performed by any convenient method such as filtering, settling,d ecanting, centrifuging, and the like. We have found that separation is significantly improved by treating the slurry from the acidulation stage with a flocculating agent. Although any agent suitable for flocculating finely divided mineral particles in an acidic medium can be utilized, we have found that very good gangue flocculation and separation is achieved by treating the acidulation slurry with from about 2 ppm to about 50 ppm, preferably from 5 ppm to 15 ppm, nonionic polyacrylamide flocculant. The flocculant is added from 0.5 to 5 minutes, preferably from 1 to 3 minutes, before the acidulation slurry is separated into its solid and liquid phase constituents.

After separation, the monocalcium phosphate-phosphoric acid solution is returned to the wet-process acid plant wherein it is reacted with sulfuric acid to produce phosphoric acid and calcium sulfate. The gangue residue is washed to collect adhering solution, and the wash liquor is added to the monocalcium phosphate-phosphoric acid solution, preferably, used to wash the calcium sulfate filter cake produced in the conventional wet-process plant.

Figure 2:
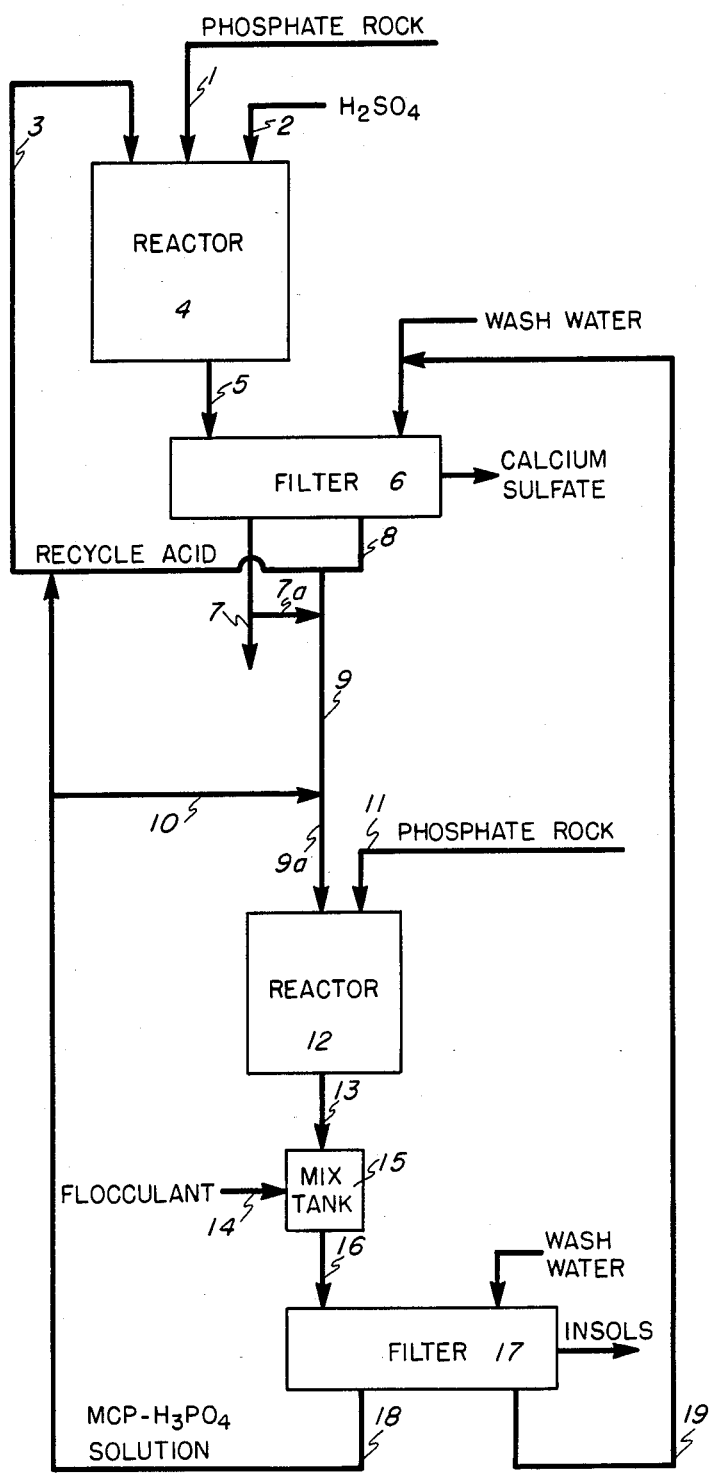
FIG. 2 is a diagrammatic flow chart illustrating one preferred embodiment of the present invention.

Referring now more specifically to FIG. 2, therein is shown a flowsheet generally illustrating a preferred embodiment of the present invention. Phosphoric acid is withdrawn via line 9 from, for example, a commercial wet-process phosphoric acid manufacturing plant represented herein for the sake of convenience, by elements 1 through 8 and is mixed with recycled monocalcium phosphate-phorphoric acid solution (MCP-H3PO4) introduced via line 10, to produce an attack acid mixture containing less than about 2.0 percent, and preferably less than about 1.5 percent free $H_2SO_4$. The resulting attack acid and phosphate rock, from a source not shown, are introduced into reactor 12 via lines 9a and 11, respectively, to effect dissolution of the phosphate rock and formation of a slurry therein comprising a solution of monocalcium phosphate in phosphoric acid and undissolved material. The resulting slurry in reactor 12 is transferred via line 13 to mix tank 15 where it is treated with flocculant introduced thereinto, from a source not shown, via line 14. The resulting flocculated slurry is passed from mix tank 15, via line 16, to filter separator 17 where filterable solids are removed. The resulting filtrate solution of monocalcium phosphate in phosphoric acid is returned from separator 17, via line 18, to conventional wet-process phosphoric acid plant 1–8 wherein it is incorporated into the recycle acid circuit and passed via line 3 into reactor 4 for subsequent treatment with sulfuric acid to further produce calcium sulfate and phosphoric acid. In the meantime, the filtered insoluble materials are washed and the wash filtrate is returned via line 19 to conventional wet-process acid plant 1–8 wherein it is used to wash the calcium sulfate filter cake on filter 6.

EXAMPLES

In order that those skilled in the art may better understand how the present invention can be practiced, the following examples are given by way of illustration and not necessarily by way of limitation.

In the pursuit of further information gathered specifically for the purpose of more clearly defining the parameters affecting the practice of the instant invention the investigations herein reported in the following examples I to VIII were made to determine the response of low purity phosphate rock taken from various sources and of a variety of compositions to a number of parameters relative to the operation of the process of the instant invention.

EXAMPLE I

A sample of Florida phosphate rock containing 23.7 percent $P_2O_5$, 35.2 percent CaO, 2.8 percent F, 31.5 percent $SiO_2$, 0.86 percent $Al_2O_3$, and 0.82 percent $Fe_2O_3$ was crushed and sized to produce a feed material with 91 percent passing a 35-mesh sieve and 12 percent passing a 120-mesh sieve. Twenty-five grams of this material was mixed with 400 grams of phosphoric acid solution, which was prepared from 85 percent reagent $H_3PO_4$ and diluted with sufficient amounts of water so as to contain 30 percent $P_2O_3$. The resulting mixture was stirred at 75° C. for 13 minutes, then treated with 2 milligrams of nonionic polyacrylamide flocculating agent and stirred an additional 2 minutes with the temperature thereof maintained at said 75° C. The flocculated mixture was filtered on a monofilament fabric filter of nominal pore size 55 microns, and 407 grams of solution containing 30.6 percent $P_2O_5$, 2.17 percent CaO, and 0.092 percent $R_2O_3$ (i.e., $Al_2O_3+Fe_2O_3$) was collected. The residue was washed two times with 20 milliliters of distilled water. The first wash filtrate contained 6.6 percent $P_2O_5$ and 0.44 percent CaO, and the second wash filtrate contained 1.5 percent $P_2O_5$ and 0.11 percent CaO. The primary filtrate and the two wash filtrates contained 99.8 percent of the total acid and rock $P_2O_5$ input. On the basis of unrecovered $P_2O_5$ the rock $P_2O_5$ extraction efficiency was 96 percent. Coextraction of $R_2O_3$ impurities was 78 percent.

EXAMPLE II

Thirty grams of a Florida phosphate rock flotation feed containing 8.6 percent $P_2O_5$, 12.5 percent CaO, 1.2 percent F, 74.2 percent $SiO_2$, 1.03 percent $Al_2O_3$, and 0.42 percent $Fe_2O_3$ and being nominally sized to minus 35-mesh plus 150 mesh was mixed with 300 grams of 30 percent $P_2O_5$ phosphoric acid solution and stirred 8 minutes at 55° C., treated with 1.3 milligrams of nonionic polyacrylamide flocculant, stirred an additional 2 minutes at said temperature, then filtered and washed in the same manner as that described in Example I, supra. The calcium phosphate phosphoric acid filtrate solution contained 30.6 percent $P_2O_5$, 1.2 percent CaO, and 0.06 percent $R_2O_3$; the first wash filtrate contained 9.2 percent $P_2O_5$ and 0.4 percent CaO, and the second wash filtrate contained 1.3 percent $P_2O_5$ and 0.1 percent CaO. The rock $P_2O_5$ extraction efficiency was 96 percent, and 40 percent of the $R_2O_3$ impurities in the feed rock was coextracted in the three solutions.

EXAMPLE III

To exemplify the selective extraction of phosphate values from phosphate rock containing relatively high amounts of aluminum and iron impurities; e.g., a ratio of the (%$Al_2O_3$+%$Fe_2O_3$):%$P_2O_5$ greater than about 0.2 by the method of the present invention, samples of a phosphate rock containing 32.7 percent $P_2O_5$, 45.1 percent CaO, 3.5 percent F, 5.3 percent $SiO_2$, 3.4 percent $Al_2O_3$, and 3.3 percent $Fe_2O_3$, and sized to nominally minus 9-mesh plus 16 mesh, was reacted with samples of wet-process phosphoric acid. The acid had been produced by reaction of lower impurity content phosphate rock with sulfuric acid, and contained 27.9 percent $P_2O_5$, 0.05 percent CaO, 0.87 percent F, 0.93 percent $SO_3$, 0.18 percent $SiO_2$, 0.46 percent $Al_2O_3$, and 0.95 percent $Fe_2O_3$. Weights of feed rock and attach acid were varied to produce a range of values in the ratio of the amount of $P_2O_5$ added to the reaction mixture in the form of feed rock to the amount of $P_2O_5$ added to the reaction mixture in the form of attack acid. Values of these ratios are given below. The reaction mixtures were stirred at 55° C. for various lengths of time, also listed below. In each acidulation run, from about 1 to 2 minutes prior to the anticipated filtration, nonionic polyacrylamide flocculating agent was added to the reaction mixture in an amount that produced a concentration of flocculant in the mixture of from 2.5 to 6.5 ppm (wt/wt basis). The flocculated mixtures were vacuum filtered through Whatman 541 filter paper circles, and the residues were water washed, dried, weighed, and analyzed. Extraction efficiencies calculated from the known amounts of $P_2O_5$, $Al_2O_3$, and $Fe_2O_3$ in the feed rock and residue samples were as follows:

| Run Number | Ratio Rock $P_2O_5$:Acid $P_2O_5$ | Reaction time, min | Percent extracted $P_2O_5$ | $Al_2O_3$ | $Fe_2O_3$ |
|---|---|---|---|---|---|
| 26 | 10 | 60 | 84.5 | 53.3 | 47.9 |
| 12 | 21 | 60 | 90.8 | 58.1 | 52.5 |
| 30 | 30 | 60 | 93.0 | 43.8 | 49.8 |
| 24 | 19 | 15 | 65.7 | 29.5 | 23.2 |
| 16 | 20 | 30 | 80.4 | 47.4 | 34.4 |
| 9 | 20 | 120 | 93.0 | 71.9 | 70.2 |

Compositions of the solutions collected by filtration of the flocculated rock-acid reaction mixtures were as follows:

| Run Number | Solution Composition, Wt % | | | | | |
|---|---|---|---|---|---|---|
| | $P_2O_5$ | $SO_3$ | F | $Al_2O_3$ | $Fe_2O_3$ | CaO |
| 26 | 29.4 | 0.13 | 1.5 | 0.57 | 0.90 | 2.5 |
| 12 | 28.9 | 0.29 | 1.4 | 0.54 | 0.93 | 1.4 |
| 30 | 27.9 | 0.33 | 1.2 | 0.51 | 0.93 | 0.8 |
| 24 | 29.4 | 0.44 | 1.2 | 0.51 | 0.95 | 1.0 |
| 16 | 28.9 | 0.34 | 1.3 | 0.54 | 0.91 | 1.4 |
| 9 | 28.9 | 0.26 | 1.2 | 0.57 | 0.98 | 1.4 |

EXAMPLE IV

Samples of phosphate rock containing 29.8 percent $P_2O_5$, 39.5 percent CaO, 3.2 percent F, 14.0 percent $SiO_2$, 3.9 percent $Al_2O_3$, and 3.0 percent $Fe_2O_3$, and sized to nominally minus 16-mesh plus 32 mesh, were reacted with samples of the same wet-process acid and in the same manner as that described in Example III supra. The observed extraction efficiencies were as follows:

| Run Number | Ratio Rock $P_2O_5$:Acid $P_2O_5$ | Reaction time, min | Percent extracted $P_2O_5$ | $Al_2O_3$ | $Fe_2O_3$ |
|---|---|---|---|---|---|
| 31 | 11 | 60 | 89.8 | 53.8 | 42.7 |
| 22 | 21 | 60 | 90.8 | 53.7 | 41.3 |
| 28 | 29 | 60 | 91.5 | 64.5 | 51.7 |
| 10 | 23 | 15 | 83.8 | 32.7 | 24.1 |
| 20 | 22 | 30 | 89.0 | 42.5 | 36.0 |
| 23 | 21 | 120 | 92.6 | 72.7 | 64.8 |

Compositions of the solutions collected by filtration of the flocculated rock-acid reaction mixtures were as follows:

| Run Number | Solution Composition, Wt % | | | | | |
|---|---|---|---|---|---|---|
| | $P_2O_5$ | $SO_3$ | F | $Al_2O_3$ | $Fe_2O_3$ | CaO |
| 31 | 29.2 | 0.18 | 1.5 | 0.64 | 0.90 | 2.5 |
| 22 | 29.0 | 0.24 | 1.1 | 0.59 | 0.96 | 1.3 |
| 28 | 28.5 | 0.31 | 1.2 | 0.58 | 0.96 | 0.8 |
| 10 | 27.8 | 0.35 | 1.0 | 0.49 | 0.90 | 1.0 |
| 20 | 29.1 | 0.40 | 1.0 | 0.56 | 0.93 | 1.3 |
| 23 | 29.1 | 0.26 | 1.2 | 0.60 | 0.98 | 1.3 |

EXAMPLE V

Samples of phosphate rock containing 21.9 percent $P_2O_5$, 29.0 percent CaO, 2.4 percent F, 36.5 percent $SiO_2$, 2.9 percent $AL_2O_3$, and 2.2 percent $Fe_2O_3$, and sized to nominally minus 32-mesh plus 60 mesh, were reacted with samples of the same wet-process acid and in the same manner as that described in Example III supra. The observed extraction efficiencies were as follows:

| Run Number | Ratio Rock $P_2O_5$:Acid $P_2O_5$ | Reaction time, min | Percent extracted $P_2O_5$ | $Al_2O_3$ | $Fe_2O_3$ |
|---|---|---|---|---|---|
| 33 | 11 | 60 | 90.9 | 50.7 | 30.6 |
| 15 | 22 | 60 | 90.1 | 64.9 | 51.3 |
| 27 | 38 | 60 | 93.8 | 76.8 | 48.5 |
| 13 | 23 | 15 | 88.9 | 36.8 | 29.1 |
| 25 | 23 | 30 | 91.4 | 53.3 | 40.5 |
| 6 | 22 | 120 | 89.9 | 77.4 | 70.0 |

Compositions of the solutions collected by filtration of the flocculated rock-acid reaction mixtures were as follows:

| Run Number | Solution Composition, Wt % | | | | | |
|---|---|---|---|---|---|---|
| | $P_2O_5$ | $SO_3$ | F | $Al_2O_3$ | $Fe_2O_3$ | CaO |
| 33 | 29.4 | 0.18 | 1.3 | 0.63 | 0.89 | 2.5 |
| 15 | 28.8 | 0.32 | 1.3 | 0.59 | 0.94 | 1.2 |
| 27 | 28.5 | 0.34 | 1.3 | 0.55 | 0.96 | 0.6 |
| 13 | 28.9 | 0.32 | 1.5 | 0.53 | 0.92 | 1.2 |
| 25 | 30.2 | 0.39 | 1.3 | 0.60 | 0.99 | 1.3 |
| 6 | 28.3 | 0.21 | 1.1 | 0.58 | 0.97 | 1.2 |

EXAMPLE VI

Samples of phosphate rock containing 18.4 percent $P_2O_5$, 24.8 percent CaO, 2.0 percent F, 46.2 percent $SiO_2$, 2.4 percent $Al_2O_3$, and 1.7 percent $Fe_2O_3$, and sized to nominally minus 60-mesh plus 115 mesh, were reacted with samples of the same wet-process acid and in the same manner described in Example III supra. The observed extraction efficiencies were as follows:

| Run Number | Ratio Rock $P_2O_5$:Acid $P_2O_5$ | Reaction time, min | Percent extracted | | |
|---|---|---|---|---|---|
| | | | $P_2O_5$ | $Al_2O_3$ | $Fe_2O_3$ |
| 29 | 11 | 60 | 90.8 | 57.3 | 35.8 |
| 14 | 22 | 60 | 93.3 | 62.0 | 49.0 |
| 32 | 34 | 60 | 94.6 | 67.5 | 46.4 |
| 7 | 24 | 15 | 93.7 | 39.0 | 32.8 |
| 19 | 22 | 30 | 90.6 | 45.3 | 32.3 |
| 21 | 24 | 120 | 93.9 | 69.7 | 62.3 |

Compositions of the solutions collected by filtration of the flocculated rock-acid reaction mixtures were as follows:

| Run Number | Solution Composition, Wt % | | | | | |
|---|---|---|---|---|---|---|
| | $P_2O_5$ | $SO_3$ | F | $Al_2O_3$ | $Fe_2O_3$ | CaO |
| 29 | 29.0 | 0.15 | 1.5 | 0.63 | 0.87 | 2.6 |
| 14 | 29.0 | 0.30 | 1.3 | 0.58 | 0.94 | 1.2 |
| 32 | 28.8 | 0.51 | 1.4 | 0.57 | 0.96 | 0.8 |
| 7 | 29.0 | 0.18 | 1.0 | 0.52 | 0.94 | 1.0 |
| 19 | 28.8 | 0.32 | 1.3 | 0.57 | 0.91 | 1.2 |
| 21 | 28.7 | 0.26 | 1.2 | 0.62 | 0.97 | 1.1 |

EXAMPLE VII

To further exemplify the selective extraction of phosphate from low purity phosphate rock, a low-sulfate content attack acid was prepared by mixing a "black" wet-process phosphoric acid with calcium carbonate to cause partial removal of free sulfate by precipitation of calcium sulfate. After filtration of the calcium sulfate, the acid contained, by weight, 28.9 percent $P_2O_5$, 0.6 percent $SO_3$, 1.3 percent F, 0.44 percent $Al_2O_3$, 0.94 percent $Fe_2O_3$, and 0.24 percent CaO. The phosphate rock of Example III, supra, was reacted with a portion of this low-sulfate content attack acid at a temperature of 55° C. and other reaction conditions recited below. The reaction and filtration operations were conducted in the same manner as described in Example III supra. Results from these reaction experiments were as follows:

| Run Number | Ratio Rock $P_2O_5$:Acid $P_2O_5$ | Reaction time, min | Percent extracted | | |
|---|---|---|---|---|---|
| | | | $P_2O_5$ | $Al_2O_3$ | $Fe_2O_3$ |
| 39-6 | 22 | 15 | 64.5 | 32.6 | 27.0 |
| 39-2 | 23 | 60 | 91.9 | 49.2 | 51.2 |
| 39-7 | 21 | 120 | 94.1 | 68.7 | 65.8 |

Compositions of the solutions collected by filtration of the flocculated rock-acid reaction mixtures were as follows:

| Run Number | Solution Composition, Wt % | | | | | |
|---|---|---|---|---|---|---|
| | $P_2O_5$ | $SO_3$ | F | $Al_2O_3$ | $Fe_2O_3$ | CaO |
| 39-6 | 30.5 | 0.09 | 1.2 | 0.50 | 0.97 | 1.1 |
| 39-2 | 30.4 | 0.05 | 1.5 | 0.55 | 0.97 | 1.5 |
| 39-7 | 30.4 | 0.06 | 1.4 | 0.57 | 0.97 | 1.8 |

EXAMPLE VIII

Samples of the phosphate rock described in Example V, supra, were reacted with portions of the same low-sulfate content acid and in the same manner described in Example VII supra. Results from the reaction experiments were as follows:

| Run Number | Ratio Rock $P_2O_5$:Acid $P_2O_5$ | Reaction time, min | Percent extracted | | |
|---|---|---|---|---|---|
| | | | $P_2O_5$ | $Al_2O_3$ | $Fe_2O_3$ |
| 39-3 | 23 | 15 | 89.9 | 30.6 | 26.0 |
| 39-5 | 22 | 60 | 92.6 | 58.7 | 45.5 |
| 39-13 | 23 | 120 | 94.6 | 76.8 | 62.3 |
| 39-4 | 21 | 120 | 95.7 | 74.9 | 71.9 |

Compositions of the solutions collected by filtration of the flocculated rock-acid reaction mixtures were as follows:

| Run Number | Solution Composition, Wt % | | | | | |
|---|---|---|---|---|---|---|
| | $P_2O_5$ | $SO_3$ | F | $Al_2O_3$ | $Fe_2O_3$ | CaO |
| 39-3 | 29.9 | 0.05 | 1.7 | 0.52 | 0.92 | 1.4 |
| 39-5 | 30.1 | 0.04 | 1.3 | 0.58 | 0.95 | 1.6 |
| 39-13 | 30.7 | 0.07 | 1.6 | 0.60 | 1.01 | 1.6 |
| 39-4 | 29.8 | 0.05 | 1.4 | 0.57 | 0.95 | 1.4 |

INVENTION PARAMETERS

After sifting and winnowing through the data supra, as well as other results of tests and operations of our new, novel, and improved method of extracting phosphate from low purity phosphate rock, we now present the acceptable and preferred parameters and variables therefore as shown below.

| Variables | Operating Range | Preferred |
|---|---|---|
| Attack acid (Line 9a of FIG. 2) | | |
| Phosphoric acid concentration (% $P_2O_5$) | 20–50 | 25–35 |
| Sulfuric acid concentration (% $H_2SO_4$) | 0–2 | 0–1.5 |
| Extraction stage (Reactor 12 of FIG. 2) | | |
| Feed rock size, mesh | −14, +400 | −32, +150 |
| Weight ratio, attack acid $P_2O_5$/rock $P_2O_5$ | 10:1–40:1 | 15:1–25:1 |
| Reaction temperature, °C. | 25–80 | 45–65 |
| Retention time, min | 5–120 | 10–60 |

While we have shown and described particular embodiments of our invention, modifications and variations thereof will undoubtedly occur to those skilled in the art. We wish it to be understood therefore that the appended claims are intended to cover such modifications and variations which are within the true scope and spirit of our invention.

What we claim as new and desire to secure by Letters Patent of the United States is:

1. In an improved process for recovering phosphate values contained in relatively low purity phosphate rock feed material comprising the steps of sequentially reacting said phosphate rock with phosphoric acid to produce a solution of calcium phosphate in phosphoric acid and a solid phase mixture comprising undissolved impurity minerals, calcium fluoride, calcium sulfate, fluosilicate compounds, and mixtures thereof; separating the resulting solution and solid phases; reacting said solution with sulfuric acid to effect the formation, in wet-process phosphoric acid production means, of calcium sulfate and phosphoric acid; and separating said calcium sulfate from said phosphoric acid product, the improvement in combination therewith comprising the additional steps of:

(a) removing phosphoric acid from said wet-process phosphoric acid production means and mixing same with a solution of calcium phosphate in phosphoric acid to prepare an acid mixture adjusted so as to contain in amounts up to about 1.5 percent soluble sulfate (expressed as $H_2SO_4$) and between about 20 to 50 percent $P_2O_5$ by weight;

(b) reacting said acid mixture from step (a) supra with said phosphate rock feed material at a temperature ranging from about 45° C. to about 65° C. and for a period of time ranging from about 10 minutes to about 60 minutes to produce a slurry comprising a solution of calcium phosphate in phosphoric acid and a solid phase of undissolved and insoluble impurity compounds;

(c) separating said solution and said solid phases in step (b) supra;

(d) recycling a portion of said solution of calcium phosphate in phosphoric acid recovered in step (c) supra to said acid soluble sulfate concentration adjustment of step (a) supra;

(e) returning the remainder of said calcium phosphate-phosphoric acid solution recovered in step (c) supra to said phosphoric acid production means and blending same with acid and phosphate rock inputs thereto together with the phosphate values contained in said calcium phosphate-phosphoric acid solution to effect conversion to phosphoric acid product;

(f) washing said solid material separated in step (c) supra to recover therefrom adhering calcium phosphate-phosphoric acid solution; and (g) returning the wash liquor recovered in step (f) supra to said phosphoric acid production means and effecting the incorporation thereof into the calcium sulfate filter cake washing and acid recycle operations therein;

said process characterized by the fact that the extraction efficiency of reacting said phosphoric acid on said phosphate rock to produce said calcium phosphate solution in phosphoric acid is at least as great as about 90 percent.

2. The process of claim 1 wherein step (a) thereof said acid mixture is adjusted to contain between about 25 percent $P_2O_5$ and about 35 percent $P_2O_5$ by weight.

3. The process of claim 2 wherein said phosphate rock feed material in step (b) is a phosphate rock flotation feed material produced by washing and sizing a phosphate ore to collect particles in the size range from about minus 14-mesh to about plus 400 mesh.

4. The process of claim 2 wherein the adjustment of the attack acid free sulfuric acid concentration in step (a) therein is effected by mixing phosphoric acid removed from said wet-process phosphoric acid production means with finely ground phosphate rock and wherein the calcium phosphate-phosphoric acid solution recycle in step (d) thereof is substantially eliminated therefrom.

5. The process of claim 3 wherein from about 2 ppm to about 50 ppm of a nonionic flocculant is added to the slurry produced in step 1 (b) and mixed therewith for a period of time ranging upwards of 5 minutes prior to the separation of step 1 (c).

6. The process of claim 5 wherein said nonionic flocculant is polyacrylamide and is utilized therein in amounts ranging from about 5 ppm to about 15 ppm, and for a period of time ranging from about 1 to about 3 minutes prior to said step 1 (c) separation step.

* * * * *